United States Patent [19]

Pawate et al.

[11] Patent Number: 5,678,021
[45] Date of Patent: Oct. 14, 1997

[54] APPARATUS AND METHOD FOR A MEMORY UNIT WITH A PROCESSOR INTEGRATED THEREIN

[75] Inventors: Basavaraj L. Pawate, Dallas; Kenneth A. Poteet; Joe H. Neal, both of Sugar Land, all of Tex.

[73] Assignee: Texas Instruments Incorporated, Dallas, Tex.

[21] Appl. No.: 324,291

[22] Filed: Oct. 17, 1994

Related U.S. Application Data

[63] Continuation of Ser. No. 934,955, Aug. 25, 1992, abandoned.

[51] Int. Cl.$^6$ .............................. G06F 13/16; G06F 12/00
[52] U.S. Cl. .......................... 395/431; 395/442; 395/474; 395/479; 395/200.05
[58] Field of Search ........................... 395/474, 477, 395/478, 479, 431, 293, 442, 200.05, 428

[56] References Cited

U.S. PATENT DOCUMENTS

| | | | |
|---|---|---|---|
| 3,962,682 | 6/1976 | Bennett | 395/571 |
| 4,314,353 | 2/1982 | Gunter et al. | 395/306 |
| 4,349,870 | 9/1982 | Shaw et al. | 395/800 |
| 4,368,514 | 1/1983 | Persaud et al. | 395/200.05 |
| 4,823,257 | 4/1989 | Tonomura | 395/707 |
| 5,088,023 | 2/1992 | Nakamura et al. | 395/430 |
| 5,134,711 | 7/1992 | Asthana et al. | 395/800 |
| 5,438,666 | 8/1995 | Craft et al. | 395/293 |

OTHER PUBLICATIONS

Tom Goodman, "Application-Specific RAM Architectures Attack New Applications," *Wescon Conference Proceedings*, 1986, pp. 1–5.
Steve Z. Szirom, "Intelligent Memories Promise Product and Market Niches," *Wescon Conference Proceedings*, 1989, pp. 24–28.
A. Asthana, et al., "An Intelligent Memory System," *Computer Architecture News*, 19__, pp. 12–20.
I. Aleksander, "Intelligent Memories and the Silicon Chip," *IEE Electronics & Power*, 1980, pp. 324–326.
Stephen Walters, "Memories with Internal Logic Cut External Circuit Needs," *EDN*, 1981, pp. 239–244.
Roderic Beresford, "Smart Memories Seek Honors in Proliferating Small Systems," *Electronics*, 1982, pp. 89–98.
Gary Wood, "Intelligent Memory Systems Can Operate Nonstop," *Electronic Design*, 1982, pp. 243–250.
P. Corsini, et al., "Intelligent Memory Subsystem Supporting Memory Virtualisation," *Electronics Letters*, 1983, pp. 265–266.
Karl Goser, et al., "Intelligent Memories in VLSI," *Information Sciences* 34, 1984, pp. 61–82.
Cecil Kaplinsky, et al., "Memory Controller Gives a Microprocessor a Big Mini's Throughput," *Electronic Design*, 1984, pp. 153–164.
M. Andrews, et al., "Concurrency and Parallelism –Future of Computing," *Super Computing ACM*, 1985, pp. 224–230.

(List continued on next page.)

*Primary Examiner*—Eddie P. Chan
*Assistant Examiner*—Reginald Bragdon
*Attorney, Agent, or Firm*—William W. Holloway; Wade James Brady, III; Richard L. Donaldson

[57] ABSTRACT

A smart memory (10) is provided that includes data storage (12 and 18) and a processing core (14 and 16) for executing instructions stored in the data storage area (12 and 18). Externally, smart memory (10) is directly accessible as a standard memory device. In a first mode of operation, the smart memory (10) is a data storage facility for an associated central processing unit (22). In a second mode of operation, the smart memory (10) is a storage facility for the processing core (14 and 16) and for central processing unit (22) for simultaneous execution of instructions. The central processing unit (22) controls the mode of operation and determines the instructions executed by the processing core (14 and 16). The wide data bus, available with an integrated processor/storage facility, permits certain processing operations to be off-loaded to the smart memory (10) where the processing operations can be performed more efficiently.

35 Claims, 2 Drawing Sheets

OTHER PUBLICATIONS

Hartmut Schrenk, "Novel Chip Card Concept with the SLE 4401 K Intelligent Memory," *Telecom Report* 9, (1986) No. 3, 1986, pp. 172–176.

Robert Grondalski, et al., "Session XVI: Microprocessors–Special Purpose THPM 16.3: A VLSI Chip Set for a Massively Parallel Architecture", *IEEE International Solid–State Circuits Conference*, Feb., 1987, pp. 198, 199, 399, 400.

S. J. Bailey, "Intelligent Memories Strengthen Bonds between Central/Distributed Control," *Control Engineering*, Jun., 1987, pp 69–73.

Ron Wilson, et al., "Intelligent Memory Architectures Attack Real–World Computation," *Computer Design*, 1988, pp. 28–30.

A. F. Johnson, "Busting Imaging Barriers with a Mac II," *ESD: THE Electronic System Design Magazine*, Jul. 1988, pp. 79–82.

Masood Namjoo, et al., "Implementing SPARC: A High–Performance 32–Bit RISC Microprocessor," *Sun Technology*, Winter, 1988, pp. 42–48.

Abhaya Asthana, et al., "Impact of Advanced VLSI Packaging on the Design of a Large Parallel Computer," *1989 International Conference on Parallel Processing*, 1989, pp. I-323 –I-327.

Patrice Bertin, et al., "Introduction to Programmable Active Memories," *Digital Paris Research Laboratory*, Jun. 1989, pp. 1–9.

Dik Lun Lee, et al., "HYTREM—A Hybrid Text Retrieval Machine for Large Databases," *IEEE Transactions on Computers*, Jan. 1990, pp. 111–123.

Don Speck, "The Mosiac Fast 512K Scalable CMOS dRAM," *Advanced Research in VLSI 1991; UC Santa Cruz*, 1991, pp. 229–244.

Alex Medelsohn, "Will Monolithic or Multichip Processors Win the Performance Race?," *Computer Design*, May, 1991, pp. 100–110.

Randy Groves, "Design Decisions and Technology That Were Keys to Success of RISC System/6000," *Computer Design*, May, 1991, pp. 112–114.

Gideon Intrater, "How High–Ended Embedded Processors Are Changing," *Computer Design*, May, 1991, pp. 116–121.

C. Y. Lee, "Intercommunicating Cells, Basis for a Distributed Logic Computer", *Proceedings—Fall Joint Computer Conference*, 1962, pp. 130–136.

C. Y. Lee, "A Content Addressable Distributed Logic Memory with Applications to Information Retrieval," *Proceedings of the IEEE*, 1963, pp. 924–932.

Chat–Yu Lam, et al., "The Intelligent Memory System Architecture –Research Directions," *Department of Defense, Defense Technical Information Center*, 1979, pp. 1–36.

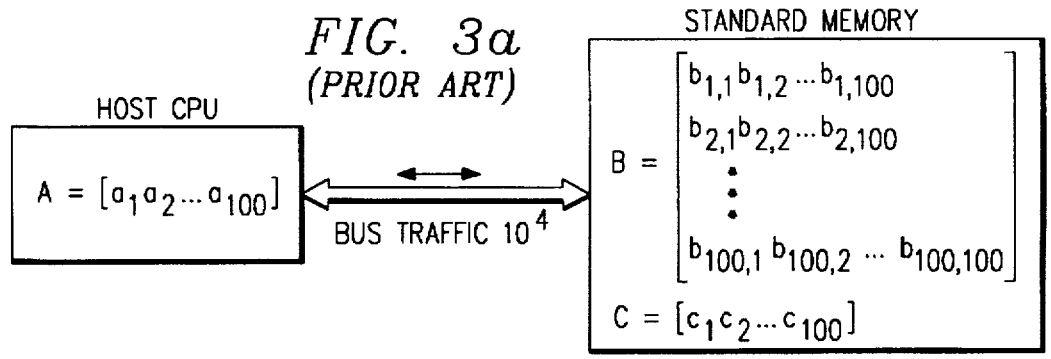
FIG. 3a (PRIOR ART)
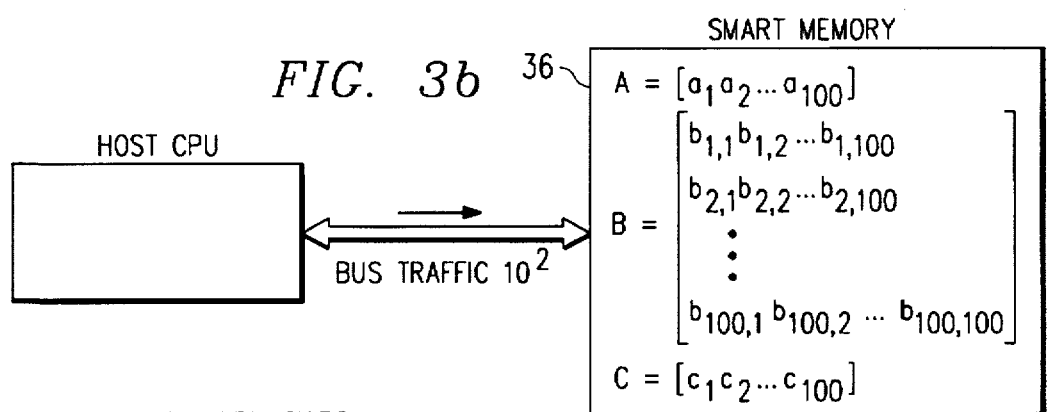
FIG. 3b
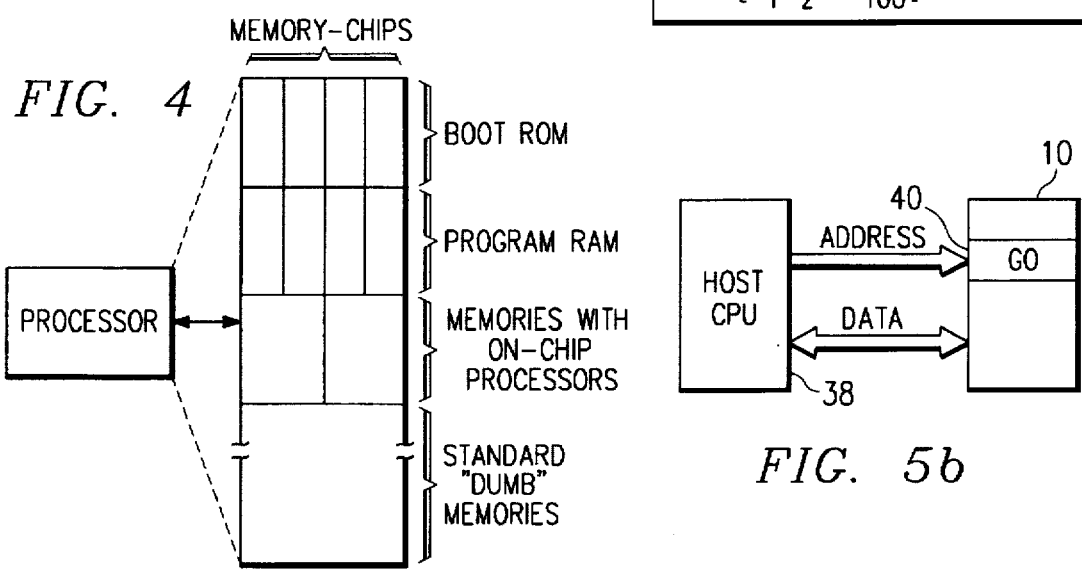
FIG. 4
FIG. 5b
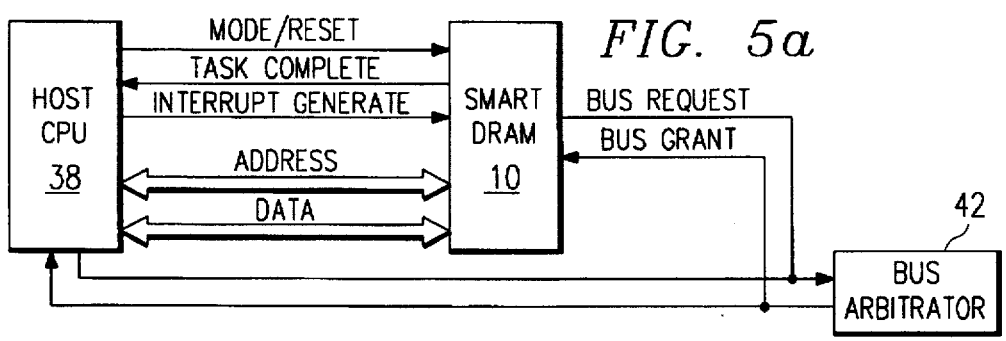
FIG. 5a

APPARATUS AND METHOD FOR A MEMORY UNIT WITH A PROCESSOR INTEGRATED THEREIN

This application is a continuation of application Ser. No. 07/934,955, filed Aug. 25, 1992 now abandoned.

TECHNICAL FIELD OF THE INVENTION

This invention relates generally to processing, and more particularly to a method and apparatus for improved processing.

BACKGROUND OF THE INVENTION

Advances in processor technology have allowed for significant increases in processing speed. However, in applications that are intensive in off-processor chip memory accesses, such as speech, signal, and image processing applications, the gain in raw processing speed is often lost because of relatively slow access times to the off-chip memories. This problem is further aggravated since memory technology has focused on increased device density. With increased device density, the maximum bandwidth of a system decreases because multiple bus architectures are defeated. For example, a graphics application requiring storage of a 480×240 sixteen-bit image has four times the bandwidth if eight 256K memory chips are used, rather than two of the more dense 1 megabyte chips.

Several strategies have been proposed to overcome these difficulties. One such solution involves using an application specific integrated circuit ("ASIC") to offload time-intensive tasks from the host CPU to increase overall system throughput. This alternative, however, requires one ASIC for each function to be offloaded, and requires dedicated memory for each ASIC. Consequently, a higher overall system cost is involved, and the system throughput is increased only for those tasks for which the ASIC was designed to handle, and not for tasks in general.

Another alternative involves the use of a co-processor. Such a solution allows for tasks to be offloaded from a host CPU and allows system memory to be shared by both the host CPU and the co-processor. With this system, however, total system bandwidth is decreased because of arbitration between the host processor and the co-processor. Furthermore, well-developed software is required to make full use and provide for "seamless integration" of the co-processor.

Another alternative involves the use of an application specific processor for offloading tasks from a host CPU. This alternative may require an expensive dedicated static RAM ("SRAM") for use by the application specific processor. Thus, this alternative involves increased system cost. Furthermore, the SRAM is not available even when the attached application specific processor is idle, and well-developed software is needed for "seamless integration".

As another solution to these difficulties, significant research and effort has been directed towards multiprocessing systems for increasing throughput as the limits of decreasing processor cycle times are approached. However, difficulties in designing multiprocessing systems, developing communication protocols for such systems, and designing software support routines have deterred proliferation of multiprocessing systems. Nonetheless, many applications in signal, speech and image processing are structured and lend themselves to partitioning and parallel processing.

Thus, a need has arisen for a device and method allowing for execution of several self-contained tasks in parallel within existing architectural frameworks. Furthermore, a need has arisen for improving processor to memory bandwidth without significant cost increases and without requiring customized, specific solutions for increasing system throughput.

SUMMARY OF THE INVENTION

In accordance with the present invention, an improved method and apparatus for processing is provided. In particular, data is stored in a data in the form of data logic signal groups storage of a smart memory. Within the smart memory, a processing core is operable to execute instructions in the form of instruction logic signal groups stored in the storage area and to read and write data stored in that storage. External connections to the smart memory are arranged such that the smart memory appears as a standard memory device to external devices.

An important technical advantage of the present invention is the fact that system throughput can be increased through use of the present invention, since it allows for parallel processing.

Another important technical advantage of the present invention is the fact that existing systems can be easily upgraded through use of the present invention because it appears externally as a standard memory device. Because the present invention appears externally as a standard memory device, parallel processing can be more easily implemented.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein:

FIG. 3a is a block diagram illustrating bus traffic with a standard memory device;

FIG. 3b is a block diagram illustrating bus traffic in a system employing a device constructed according to the teachings of the present invention;

FIG. 4 is a block diagram of a memory map of a system including a device constructed according to the teachings of the present invention;

FIG. 5a is a block diagram illustrating processor control signals according to the present invention; and FIG. 5b is a block diagram illustrating processor startup of a device constructed according to the teachings of the present invention.

DETAILED DESCRIPTION OF THE INVENTION

The problems discussed in the background of the invention are addressed with the present invention by integrating a processor into a large random access memory ("RAM") in a single integrated circuit. Throughout this description, a device constructed according to the teachings of the present invention will be referred to, from time to time, as a smart memory or a smart DRAM (dynamic random access memory). These terms are used because a device constructed according to the teachings of the present invention appears externally as a random access memory chip and may have the pinout of a dynamic random access memory chip.

Figure 1A:
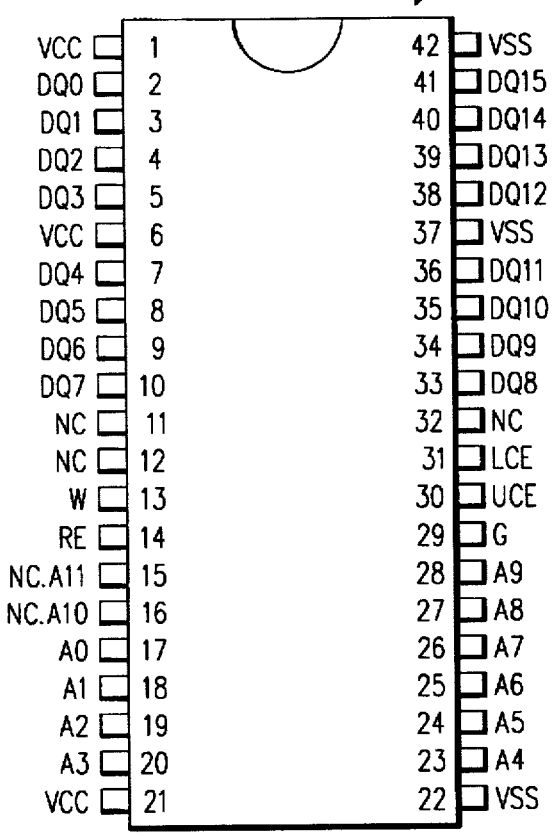
FIG. 1a illustrates an external view of a device constructed according to the present invention.
Figure 1B:
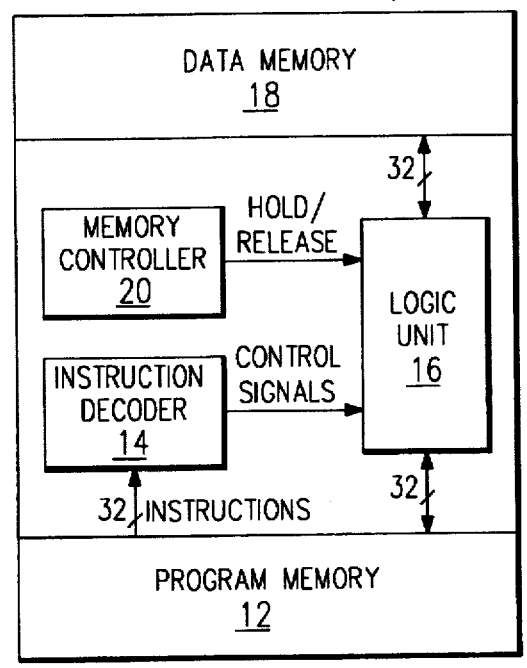
FIG. 1b is a block diagram of an internal view of a device constructed according to the teachings of the present invention.

FIGS. 1a and 1b present external and internal views of a smart DRAM in accordance with the present invention. As shown in FIG. 1a, externally, a device 10 constructed according to the teachings of the present invention appears as a standard memory device with a memory-like pinout. Device 10 may have a pinout arrangement that is the same or substantially the same as standard memory pinouts, or Device 10 may have a pinout arrangement that includes a standard memory pinout plus additional pins, as will be discussed below. In either case the pins are to be arranged such that the Device 10 is directly accessible as a standard memory device by external devices.

Device 10 includes, by way of example, 42 pins which provide equivalent input and output signal groups of a typical DRAM. Device 10 may also include other pins in addition to those of a standard memory device, for additional functionality, as will be discussed below. It should be understood that the pinout illustrated in FIG. 1a is for example only, and the pinout of Device 10 may be arranged to correspond to any standard memory pinout, such as, for example, a 48 pin DRAM, and as discussed, may include pins in addition to those of standard memories. A host CPU, such as an Intel 386 microprocessor, may access the device 10 as it would access a standard memory device.

In a particular embodiment, a smart DRAM constructed according to the teachings of the present invention may have a pinout as shown in FIG. 1a. The following table provides the pin, or lead, nomenclature for the pinout as shown in FIG. 1a.

| Pin Nomenclature | | |
|---|---|---|
| | Standard Mode | Smart Mode |
| A0-A11 | Address inputs | Address inputs |
| D-DQ15 | Data inputs/outputs | Data inputs/outputs |
| Vcc | 3.3-V power supply | 3.3-V power supply |
| Vss | Ground | Ground |
| W | WRite enable | WRite enable |
| LCE | Lower CAS | Lower CAS |
| UCE | Upper CAS | Upper CAS |
| RE | RAS | RAS |
| M/RESET | No care | Mode/Reset |
| TC | No care | Task completion |
| IG | No care | Interrupt Generate |

As shown in the table above, for a particular embodiment of the present invention, the device has 42 pins identical to a "standard" 16-Mbit DRAM device, with the three no-care pins used for special functions of the present invention, to be discussed. In a particular embodiment, the internal bus is 32 bits wide, and the memory space is byte addressable externally. The on-board processor has a 30-ns instruction cycle time, and the chip operates on a 3.3-V power supply. The on-board processor can also be powered and grounded through additional pins, or the standard power and ground pins. It should be understood that the above specifications are for a particular embodiment, and other specifications may be used without departing from the intended scope of the present invention. For example, a wider bus than 32 bits, such as a 64 bit or 128 bit wide internal bus may be used.

As shown in the block diagram of FIG. 1b, internally device 10 appears like a processor with a large on-chip memory. In the illustrated embodiment, program and data reside in partitioned data storage, although program and data may reside in the same memory space of the data storage without departing from the intended scope of the present invention. A wide internal bus, inherently available inside memory devices, connects the processor with the memory. As shown in FIG. 1b, the internal bus may be 32 bits wide. The program memory 12 is coupled to instruction decoder 14. Instruction decoder 14 decodes instructions residing within program memory 12 and outputs control signals to a logic unit 16. Logic unit 16 is also coupled to program memory 12 and to data memory 18.

Instruction decoder 14 and logic unit 16 represent the processor core integrated into a memory according to the present invention. Processor cores to be integrated may range from fairly limited processor cores, such as those including only an integer unit, to those including both fixed point and floating point multipliers. For example, a RISC-based integer unit (such as SPARC or MIPS) may be included as the processor core in the present invention. Typically, such integer units would occupy less than 10 percent of the area of a 16-Mbit DRAM. Thus, RISC cores are attractive for integration because of their relatively small size compared to other processor cores. Processor cores using hardware multipliers in addition to the integer unit may also be included. For example, a digital signal processor core, such as those used in the Texas Instruments TMS320C10-C50 digital signal processors may be integrated into smart memories according to the present invention. For example, use of a Texas Instruments TMS320C30 with its integer unit, floating point unit, 28 bit two-ported register file, and post control circuitry takes up only 22 percent of the area of a 16-Mbit DRAM.

As discussed above, program memory 12 and data memory 18 may occupy the same memory space or may be separately partitioned. A memory controller 20 is also coupled to logic unit 16. Memory controller 20 is used to ensure that external accesses to the memory of device 10 have priority over internal accesses. Thus, memory controller 20 freezes logic unit 16 during external accesses and then releases the logic unit 16 to resume processor execution after completion of the external access. External devices will have the highest memory access priority. Thus, for example, if a host processor tries to access the on-chip memory of a device constructed according to the teachings of the present invention while it is processing, then the on-chip processor will be halted.

Figure 2A:
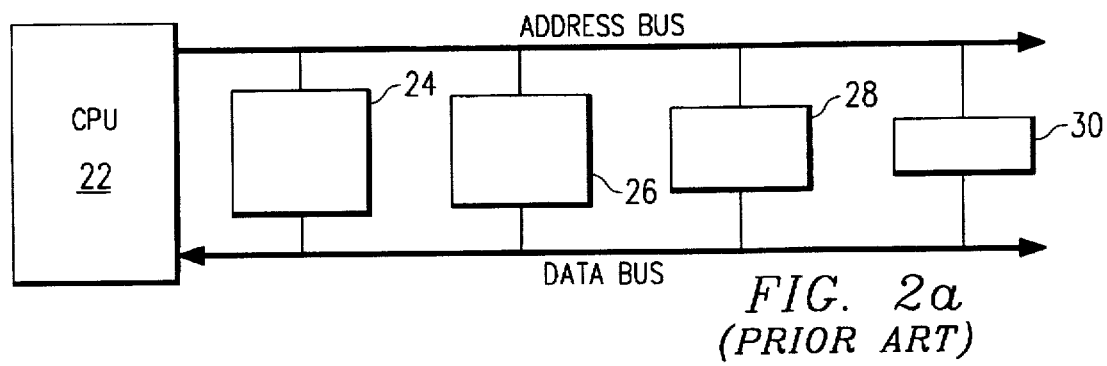
FIG. 2a is a block diagram of a typical uniprocessor system with standard memory devices.

FIG. 2a is a block diagram of a prior art uniprocessor system with four standard memory devices. As shown in FIG. 2a, the CPU 22 operates to store and retrieve data from the memory devices 24, 26, 28, and 30 through the use of an address and data bus. As an example, CPU 22 may comprise a TMS 320 made by Texas Instruments Incorporated, while memory devices 24-30 may comprise 32KX8 DRAMs.

Figure 2B:
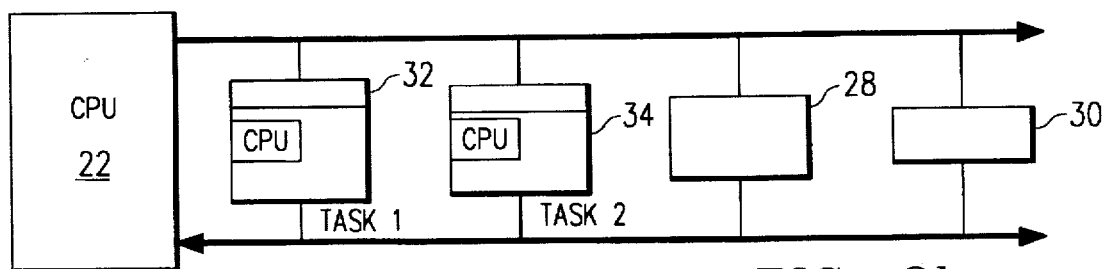
FIG. 2b is a block diagram of a system including devices constructed according to the teachings of the present invention.

FIG. 2b illustrates a system including two smart DRAMs 32 and 34 as shown in FIGS. 1a and 1b. As can be seen from FIGS. 2a and 2b, two of the standard memory devices shown in FIG. 2a have been replaced by devices constructed according to the teachings of the present invention without the need for additional hardware. Smart DRAMs 32 and 34 appear as typical memory devices, and thus are connected as if they were such memory devices. Thus, such smart memories can convert an existing uniprocessor system, such as a personal computer, into a powerful multiprocessor system without major system redesign. As shown in FIG. 2b, the two smart memory devices may be used to execute tasks in parallel with operations performed by the CPU.

Because of the design of the present invention, significant advantages are realized to systems including smart memories. One such advantage is system throughput. System throughput increases because of the simultaneous execution of several self-contained tasks. For example, in a personal computer environment, one smart memory may be executing a graphics application downloaded by a host CPU and preparing that data for output to a graphics display, while another smart memory may be executing a downloaded speech recognition routine, and still another smart memory may be sending FAXes in the background. These tasks are performed through the control of a controlling CPU. With the tasks distributed among the smart memories as described above, the only task for the central CPU would be to move the data from the smart memories to the appropriate outputs, without having to perform any processing on the data within those smart memories.

Another advantage of the present invention is improved CPU to memory bandwidth. Instead of fetching raw data from the memory, processing that data, and writing the processed results back to the memory, the host CPU now fetches only the processed data or information from the memory. Traffic on the system bus is therefore reduced. FIGS. 3a and 3b illustrate an example of reduced traffic due to use of a smart DRAM constructed according to the teachings of the present invention. In certain applications, such as speech recognition, vectors must often be multiplied by various matrices. For example, a vector A may be multiplied by a matrix B to result in a vector C. As shown in FIG. 3a, in a conventional prior art system a host CPU fetches the elements of matrix B (raw data), multiplies them with the elements of vector A, and writes the products back to memory. With a system using a smart DRAM constructed according to the teachings of the present invention, the CPU moves the elements of vector A to the smart memory 36 containing matrix B, and the smart memory 36 then calculates C by multiplying A and B, thus freeing the host CPU from this vector multiplication. For a vector size of 100 and the above example, the traffic on the system bus is reduced by a factor of 100 when a smart DRAM constructed according to the teachings of the present invention is used.

Another advantage of the present invention is that it can serve two separate functions. In the default mode, devices according to the present invention serve as memory devices. However, as will be discussed below, they can also be switched into a "smart" mode and made to execute specific tasks by downloading appropriate software. In contrast, coprocessor cards in current computers physically occupy a slot. When idle, their dedicated memory is not available to the host CPU.

The present invention also allows ease of upgrading functionality in existing systems. Designing memory subsystems and adding them to existing processor systems is easier than designing and adding processor subsystems. Today's memories are standardized components, in stark contrast to processors, and thus devices constructed according to the teachings of the present invention, because they are pin-compatible with memory chips, may be easily integrated into existing systems. Furthermore, since the address space of a processor is typically populated with several memory devices, each time a smart DRAM is added to a system, not only is additional memory added, but also additional processing capability. Thus, as the computational needs of a system grow, the system can be easily and quickly scaled up by adding smart DRAMs constructed according to the teachings of the present invention. FIG. 4 illustrates a typical processor and memory system and its inherently parallel structure. Thus, smart memories designed according to the present invention provide for parallel processing with minimum design change, since they can be added to systems just as standard memory devices are.

Another advantage of the present invention is increased processing rates because of the locality of the memory and wide internal bus structure. Since all of the data needed for a program being executed on a smart DRAM are on-chip, the processing speed is faster than if the data were off-chip. Furthermore, wide internal busses are more feasible inside a memory chip than across chip boundaries because of size and electrical characteristic considerations.

In a preferred approach, the present invention has two modes, "smart" and "standard". In the "smart" mode, the processor core is enabled to process data in the data memory 18, if instructed to begin processing. In the "standard" mode, the processing core is prevented from processing. The default operating mode is the "standard" mode. In the "standard" mode, the device operates as a memory device. As shown in FIG. 5a, the host processor 38 of the system dynamically switches the operating mode by writing to a mode pin of the smart memory 10. The mode pin may comprise a no care pin on a typical memory device such as pin 11 in FIG. 1a. By using a mode pin, the operating mode of the device is guaranteed, and software bugs cannot inadvertently switch the mode. In another alternative, the mode pin could be used as an extra address pin. Thus, when addressed in one particular range, the smart memory would function in the standard mode. When addressed in another range, it would function in the smart mode.

In another embodiment, the mode of a smart memory device could be switched without the use of a mode pin. With this approach, a fixed memory location is allocated as an operating mode switch. For example, a particular location within data memory 18 of FIG. 1b can be reserved as a mode switch. The host processor can switch operating modes by addressing and writing fixed patterns to this memory location across address and data busses as shown in FIG. 5a. The smart processor senses the pattern, or sequence of patterns, and switches modes accordingly. Other alternatives for selecting the mode of the device that do not require an extra pin like a mode pin include write-per-bit type functions or other design-for-test ("DFT") functions.

The mode pin can also be used as a reset pin. Because a smart DRAM according to the present invention includes a processor, a reset function for the processor is needed. This reset can be accomplished through the mode pin—every time the mode is switched to "smart," a reset takes place. As an alternative embodiment, an additional reset pin can be used. Furthermore, the reset function may be accomplished without the use of pin signals, but by writing patterns to particular memory locations within the smart DRAM across address and data busses as shown in FIG. 5a, as discussed in connection with the mode switch. The reset function could be associated with the same memory location as the mode switch, or a separate memory location. FIG. 5a illustrates the reset pin in combination with the mode pin.

Once in the "smart" mode, the host processor may start and stop the processor on the smart DRAM by writing fixed patterns to a fixed "go" location as shown in FIG. 5b. If not in the "smart" mode, then the processor on the smart DRAM cannot begin processing, even if the "go" instruction has been received. A host CPU 38 addresses the go memory location 40 of smart DRAM 10 and writes the fixed "go"

pattern to that location. The processor on the smart memory device will then begin to execute, provided the device is in the smart mode. After the smart memory has completed its task, it can signal the processor of its task completion through the TC pin. The TC pin, as shown in the above table and FIG. 5a, may comprise a no care pin of a standard memory device such as pin 12 in FIG. 1a. This TC pin may be connected to the interrupt line of a host CPU. It should be understood that the TC pin need not be used to signal task completion. For example, a particular memory location could be reserved as a status memory location within the smart DRAM. The host processor could poll this status memory location for a particular code indicating that a task has been completed by the smart DRAM through use of the address and data busses as shown in FIG. 5a. As another approach, the smart DRAM could have a reserved memory location for an estimate of the length of time required for completion of its task. The host CPU could read this memory location and then request the process data after the estimated length of time has elapsed.

As shown in the preceding table and FIG. 5a, an interrupt generate signal is also provided. This signal may be accomplished through a pin such as a no care pin or an additional pin, or, as discussed in connection with the mode switch, through a "soft" signal, by writing appropriate codes to particular memory locations across address and data busses shown in FIG. 5a. The interrupt generate signal causes the processor of the smart DRAM to interrupt its current task and process an interrupt task. Upon completion of the interrupt task, the initial task is resumed. The ID or address of the interrupt task can be passed by the host processor along with the interrupt generate signal.

For additional processing abilities, SMART DRAM 10 may include bus request and bus grant signals, for use in connection with a bus arbitrator 42 as shown in FIG. 5a. With this capability, SMART DRAM 10 can directly take control of the bus to perform, for example, I/O functions, to provide for more complete parallel processing.

The data read from and written to a smart DRAM by a host CPU is performed conventionally. The host CPU writes input data to the smart DRAM and reads data to be output by the smart DRAM. If a 16 bit wide external bus is used with a 32 bit host CPU, for example, the processor will have to make two reads and writes to accomplish 32 bit data transfers.

Although the present invention has been described in detail, it should be understood the various changes, substitutions and alterations can be made without departing from the spirit and scope of the invention as defined solely by the appended claims.

What is claimed is:

1. A smart memory for use with an external device, said smart memory storing data and instructions for processing by said external device, wherein a package including said smart memory has the same external lead configuration as a standard memory package, said smart memory comprising:
   a storage unit, said storage unit coupled to said external device and functioning as a memory unit for said external device, said storage unit including;
   a data memory, and
   a program memory, said program memory storing instructions; and
   a processor coupled to said external device and to said storage unit, said processor operating in response to control signals from said external device, said processor including;
   an instruction decoder for decoding instructions stored in said program memory, and
   a logic unit coupled to said instruction decoder, said logic unit processing data stored in said storage unit in response to decoded instructions, said data storage and processor integrated in a single integrated circuit, wherein said processor processes data in parallel with execution of instructions by said external device under control of said external device.

2. The smart memory of claim 1, wherein said processor switches between a smart mode and a standard mode in response to a control signal from said external device, said processor prevented from processing data in said standard mode.

3. The smart memory of claim 1, wherein said storage unit includes a specific memory location for storing mode information, said processor switching between a smart mode and a standard mode in response to mode information retrieved from said specific memory location by said processor, said processor prevented from processing data in said standard mode.

4. The smart memory of claim 1 further comprising a control signal lead coupling said external device and said processor, wherein said external device applies a control signal to said processor causing said processor to implement an interrupt task.

5. The smart memory of claim 1, wherein said storage unit includes a specific memory location for storing interrupt generate information, retrieval of said interrupt generate information in said specific memory location by said external device causing said processor to implement an interrupt task.

6. The smart memory of claim 1 further comprising a control signal lead coupling said external device and said processor, wherein said external device applies a signal to said processor over said control signal lead resulting in a resetting of said processor.

7. The smart memory of claim 1, wherein said storage unit includes a specific memory location for storing reset information by said external device, wherein said reset information retrieved from said specific location causes a resetting of said processor.

8. The smart memory of claim 1, wherein said storage unit includes a specific memory location for storing information causing said processor to start and stop executing instructions, retrieval of said information from said specific memory location by said processor controlling processing of data by said processor.

9. The smart memory of claim 1 further comprising a control signal lead coupling said external device and said processor, wherein said processor provides a signal to said external device indicating completion of a task by said processor.

10. The smart memory of claim 1, wherein said storage unit includes a task completed memory location for storage of task completed information therein by said processor, retrieval of task completed information from said task completed memory location indicating to said external device completion of a task by said processor.

11. A processing system comprising:
   at least one external device, said at least one external device including a central processing unit; and
   an integrated circuit, wherein a package including said integrated circuit has the same external lead configuration as a standard memory package, said integrated circuit including;
   a memory unit functioning as memory for said at least one external device and having;

a data memory, and a program memory, said program memory storing instructions;

a processor coupled to said memory unit and having;

an instruction decoder for retrieving and decoding instructions stored in said program memory; and a logic unit coupled to said instruction decoder for processing signal groups stored in said data memory in accordance with decoded instructions;

a system bus coupling said memory unit and said at least one external device for exchanging instructions and data therebetween; and at least one control signal lead extending between said at least one external device and said integrated circuit for connecting said at least one external device to said processor;

wherein said central processing unit and other external devices coupled to said system bus can directly access said memory during processing of signal groups by said processor.

12. The system of claim 11, wherein said central processing unit is operable to off load processing tasks to said integrated circuit for implementation by said processor.

13. The system of claim 11, wherein operation of said processor is halted during accesses to said integrated circuit by said central processing unit and by other external devices.

14. The system of claim 11 further comprising a bus arbitrator coupled to said system bus and operable to grant control of said system bus, and wherein said at least one control signal lead includes a bus request lead and a bus grant lead, said integrated circuit gaining control of said system bus by operation of said bus arbitrator.

15. A smart memory for use with an external device, wherein a package including said smart memory has the same external lead configuration as a standard memory package, said smart memory comprising:

a storage unit providing memory for said external device, said storage unit including;

a data memory storing signal groups, and a program memory, said program memory storing instructions;

a processor connected to said storage unit; said processor including;

an instruction decode unit for decoding said instructions, and a logic unit coupled to said instruction decode unit for processing signal groups in said data memory in accordance with said instructions stored in said program memory, wherein said storage unit and said processor are integrated in a single integrated circuit; and external leads providing apparatus for connecting said external device to said storage unit for an exchange of signal groups between said external device and said storage unit, wherein processing of signal groups by said processor is controlled by said external device.

16. The smart memory of claim 15 further including a control signal lead connecting said processor and said external device, wherein said external device provides a signal to said processor for switching said processor between a smart mode, wherein said processor and said external device process signal groups stored in said storage unit, and a standard mode, wherein only said external device processes signal groups from said storage unit.

17. The smart memory of claim 15, wherein said storage unit includes a specific memory location for storing mode information by said external device, retrieval of said mode information by said processor in said specific memory location resulting in a switching of said processor between a smart mode and a standard mode.

18. The smart memory of claim 15 further including a control signal lead connecting said processor and said external device, wherein said external device applies an interrupt signal to said processor causing said processor to implement an interrupt task.

19. The smart memory of claim 15, wherein said storage unit includes a specific memory location for storing interrupt generate information by said external device, retrieval of said interrupt generate information from said specific memory location by said processor causing said processor to implement an interrupt task.

20. The smart memory of claim 15 further including a control signal lead connecting said processor and said external device, wherein said external device applies a reset signal to said processor to reset said processor.

21. The smart memory of claim 15, wherein said storage unit includes a specific memory location for storing reset information by said external device, retrieval of said reset information from said specific memory location by said processor resetting said processor.

22. The smart memory of claim 15, wherein said storage unit includes a specific memory location for storing start and stop instruction information by said external device, retrieval of said start and stop instruction information from said specific memory location by said processor causing said processor to start and to stop executing instructions.

23. The smart memory of claim 15 further including a control signal lead connecting said processor and said external device, wherein said processor applies a task completed signal to said external device indicative of completion of a task by said processor.

24. The smart memory of claim 15, wherein said storage unit includes a task completed memory location for storing task complete information by said processor, retrieval of said task complete information from said task completed memory location by said external device indicating to said external device completion of a task by said processor.

25. A method of data processing by a processing device, said method comprising the steps of:

providing an external lead configuration of a package including an integrated circuit to be the same as an external lead configuration of a standard memory package, said integrated circuit having a memory unit and a processor;

storing instructions by said processing device in a program memory portion of said memory unit, said memory unit providing a memory for said processing device;

storing data from said processing device in a data memory portion of said memory unit; and as a result of control signals from said processing device, causing said processor to decode instructions stored in said program memory portion of said integrated circuit and to process data stored in said data memory portion by said processor unit, processed data being stored in said data memory portion of said memory unit for retrieval by said processing device;

wherein data and instructions stored in said memory unit of said integrated circuit are accessible by said processing device, control signals from said processing device causing said integrated circuit to operate in a first mode wherein only said processing device processes data from said memory unit, control signals from said processing device causing said integrated circuit to operate in a second mode wherein both said processing device and said processor process data in said data memory portion.

26. A smart memory for use with central processing unit, said smart memory comprising:

a storage unit coupled to said central processing unit and providing a memory for said central processing unit, said data storage and said central processing unit exchanging signal groups therebetween, said storage unit including a program memory portion for storing processor instructions, wherein a package including said smart memory has the same external lead configuration as a standard memory package; and a processor coupled to said storage unit, said storage unit and said processor exchanging signal groups therebetween, said processor including an instruction decoder for decoding instructions from said program memory portion, said smart memory having a first mode of operation in which said storage unit is accessible to said central processing unit for processing of signal groups, said smart memory having a second mode of operation wherein said storage unit is accessible to said central processing unit and to said processor for simultaneous signal group processing by said central processing unit and said processor, wherein said modes of operation are determined by control signals from said central processing unit.

27. The smart memory of claim 26 further including a memory control unit, said memory control unit preventing conflicts between said central processing unit and said processor resulting from simultaneous accesses to said storage unit, said central processing unit having priority in storage unit access conflicts.

28. The data processing unit of claim 26 wherein, in said second mode of operation, operation of said processor is suspended when said central processing unit accesses said storage unit.

29. A data processing system comprising:

a central processing unit; and an integrated device coupled to said central processing unit, wherein a package including said integrated circuit device has the same external lead configuration as a standard memory package, said integrated device including:

a processor including a logic unit and an instruction decoder; and a storage unit connected to said central processing unit and providing a memory for said central processing unit, said storage unit connected to said processor for exchanging signal groups stored in said storage unit, said storage unit including a program memory portion for storing instructions, said instructions being decoded by said instruction decoder and applied to said logic unit, said logic unit processing signal groups according to decoded instructions;

wherein said data processing system has two modes of operation, said central processing unit processing signal groups from said storage unit in a first mode of operation in response to control signals from said central processing unit, said processor and said central processing unit simultaneously processing signal groups from said data storage in response to control signals from said central processing unit in a second mode of operation.

30. For use in a data processing system having at least one connector for coupling memory modules to a processing unit, a smart memory module comprising:

an external lead configuration for attachment to said connector, wherein a package including said smart memory module has the same external lead configuration as a standard memory package;

a storage unit coupled to said external lead configuration, said processing unit interacting with said storage unit in the same manner as with a memory module, said data storage unit having a data memory for storing signal groups and a program memory for storing instructions; and a processor connected to said storage unit for exchanging signal groups therebetween, said processor including an instruction decoder coupled to said program memory for retrieving and decoding instructions stored in said program memory, said processor including a logic unit responsive to decoded instructions for processing signal groups from said storage unit, operation of said processor controlled by control signals from said processing unit.

31. The smart memory of claim 30 wherein said smart memory module has a standard mode of operation in which only said processing unit interacts with said storage unit, said smart memory having a smart mode of wherein said processing unit and said processor interact with said data storage, said processing unit controlling which mode of operation is active by control signals.

32. The smart memory of claim 30 wherein said processing unit provides control signals to said processor by storing signal groups in selected memory locations.

33. The smart memory of claim 30 further including at least one control signal path between said processing unit and said processor for a transfer of control signals therebetween.

34. The smart memory of claim 30 wherein said processing unit has priority in accessing said storage unit.

35. The smart memory of claim 30 wherein said smart memory is implemented in an integrated circuit package.

* * * * *